(No Model.)

H. T. COOK & F. SHEPARD.
CAN OPENER.

No. 432,603. Patented July 22, 1890.

Witnesses:

Inventors:
H. T. Cook
and Fred. Shepard.
By Kennedy & Kennedy
Attys.

UNITED STATES PATENT OFFICE.

HIRAM T. COOK AND FRED SHEPARD, OF ALBA, MICHIGAN.

CAN-OPENER.

SPECIFICATION forming part of Letters Patent No. 432,603, dated July 22, 1890.

Application filed November 13, 1889. Serial No. 330,119. (No model.)

*To all whom it may concern:*

Be it known that we, HIRAM T. COOK and FRED SHEPARD, citizens of the United States, and residing at Alba, in the county of Antrim and State of Michigan, have invented certain new and useful Improvements in Can-Openers, of which the following is a specification.

This invention relates to a novel construction in can-openers, and is adapted for use in cutting out a portion of the top of the can or analogous article or for cutting off the entire end of the can, whereby the contents can be removed intact.

The invention consists in the features of construction and combinations of parts hereinafter fully described, and pointed out in the appended claims.

Figure 1:
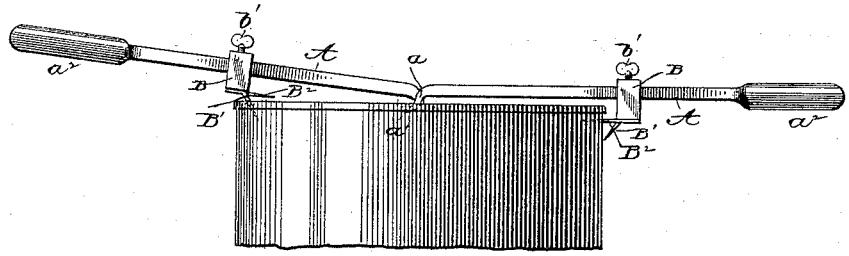
Figure 2:
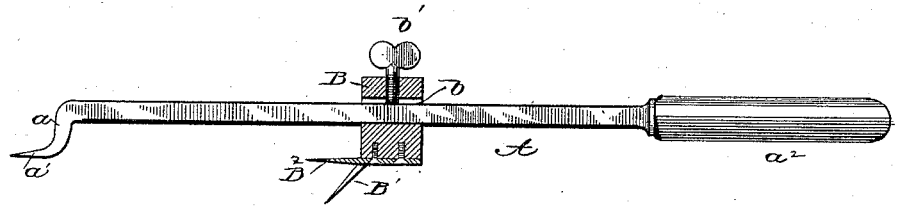
Figure 3:
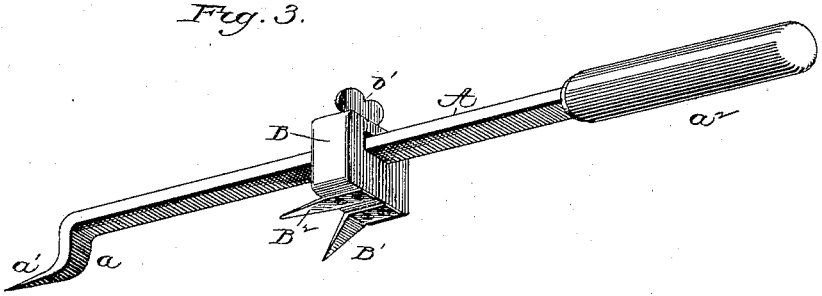
Figure 4:
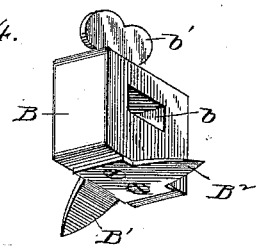

In the drawings, Figure 1 is a side view of the end portion of a can with can-openers constructed in accordance with my invention applied thereto in the act of opening the same, two of said tools being shown in the different positions they will assume in operation. Fig. 2 is a sectional view of the operating-bar and the cutters located thereon. Fig. 3 is a perspective view of the sliding block and cutters mounted on the operating-bar. Fig. 4 is a detail perspective view of the sliding block and cutters, showing a modified form of construction embodying my invention.

In said drawings, A indicates the operating bar or lever, which can be of any desired shape in cross-section, but conveniently made flat and rectangular. Said bar is provided at one end with a deflected portion $a$, terminating in a pointed end portion $a'$, arranged approximately parallel with the said bar A. The said bar A is provided at its other end with an operating-handle $a^2$.

B indicates a sliding block having an opening or aperture $b$ therethrough, through which opening or aperture the bar A is adapted to pass. The said block is adapted to slide longitudinally upon the bar A, and is provided with a set-screw $b'$, by means of which it can be clamped thereon at any adjustment. In Figs. 1, 2, and 3 said block is shown as having two laterally-projecting knives or cutters B' and $B^2$, located at one of its lower marginal edges, the said cutters B' and $B^2$ having cutting-edges at both sides and being provided with pointed ends.

The cutter B' is arranged at an incline to the block B—that is to say, it is deflected downwardly, while the cutter $B^2$ preferably lies in the same plane with the lower face of the block B, with its pointed end vertically in advance of the pointed end of the cutter B'.

The parts being constructed and assembled as described, the manner of operating the same is as follows: In use, when it is desired to cut out merely a portion of the top of the can, the cutter B' is employed. The pointed end of the bar is first inserted into the top of the can and the block adjusted and secured by means of the set-screw $b$, so as to bring the point of the cutter B' to the point where the top is to be cut. By pressing downwardly upon the handle the said cutter will be caused to enter the top of the can, whereupon by turning the handle on the deflected end portion as a pivot the said cutter will cut out the top of the can in an obvious manner. When cutting off the entire top of the can, the straight cutter $B^2$ is used. The end of the bar is inserted, as before described, and said bar is brought to a position about parallel with the top of the can, so that the point of the cutter $B^2$ will be below the upper end of the can. The sliding block is moved along and force applied to it until it pierces the side of the can and is secured immovably upon the bar by means of the set-screw. Thus it is obvious that by turning the bar, as before described, the cutter $B^2$ will be caused to cut through the side of the can just below its upper end, so that the entire top can be removed and the contents readily removed intact. The inclined cutter does not interfere with the straight cutter in this last operation, owing to the fact that its point is located in the rear of the point of the said straight cutter.

In Fig. 4 is shown a modified form of construction embodying my invention. This form of construction differs from that described only in the location of the cutters upon the block, the said cutters B' and $B^2$ being located at opposite ends of the block, as clearly shown, instead of both being on one side. The operation is the same with the exception that the block is removed and replaced upon the bar in a reverse position when it is desired to make a different form of cut.

We claim as our invention—

1. In a can-opener, the combination, with the operating-bar, of the longitudinally-movable block thereon, having the cutters B' and B² secured thereto and located in different planes, substantially as described.

2. A can-opener comprising an operating-bar having a pointed end, an adjustable sliding block upon said bar, said block having a laterally-projecting and downwardly-inclined cutter, as B', and a laterally-projecting cutter, as B², substantially as described.

3. In a can-opener, the combination, with the operating-bar, of the adjustable cutter-carrying block thereon, the laterally-projecting cutter B², and the downwardly-inclined cutter B', arranged with their points on the same side of the block, the point of the cutter B² being vertically in advance of that of the cutter B', substantially as described.

HIRAM T. COOK.
FRED SHEPARD.

Witnesses:
FRANK L. KELLEY,
QUINCY B. STOUT.